(12) United States Patent
Ito et al.

(10) Patent No.: US 11,655,324 B2
(45) Date of Patent: May 23, 2023

(54) RESIN COMPOSITION FOR OPTICAL SHAPING

(71) Applicant: KURARAY NORITAKE DENTAL INC., Kurashiki (JP)

(72) Inventors: Misaki Ito, Niigata (JP); Kenji Suzuki, Niigata (JP)

(73) Assignee: KURARAY NORITAKE DENTAL INC., Kurashiki (JP)

( * ) Notice: Subject to any disclaimer, the term of this patent is extended or adjusted under 35 U.S.C. 154(b) by 0 days.

(21) Appl. No.: 17/282,603

(22) PCT Filed: Oct. 4, 2019

(86) PCT No.: PCT/JP2019/039386
§ 371 (c)(1),
(2) Date: Apr. 2, 2021

(87) PCT Pub. No.: WO2020/071552
PCT Pub. Date: Apr. 9, 2020

(65) Prior Publication Data
US 2021/0340304 A1    Nov. 4, 2021

(30) Foreign Application Priority Data
Oct. 5, 2018   (JP) .............................. JP2018-189900

(51) Int. Cl.
| | | |
|---|---|---|
| C08F 2/46 | (2006.01) | |
| C08F 2/50 | (2006.01) | |
| C08G 61/04 | (2006.01) | |
| C08F 290/06 | (2006.01) | |
| B33Y 70/00 | (2020.01) | |
| A61C 13/00 | (2006.01) | |
| A61C 13/01 | (2006.01) | |
| C08G 18/24 | (2006.01) | |
| C08G 18/42 | (2006.01) | |
| C08G 18/44 | (2006.01) | |
| C08G 18/67 | (2006.01) | |
| C08G 18/75 | (2006.01) | |
| B33Y 10/00 | (2015.01) | |
| B33Y 80/00 | (2015.01) | |
| B29C 64/124 | (2017.01) | |
| A61C 7/08 | (2006.01) | |
| B29K 33/04 | (2006.01) | |
| B29L 31/00 | (2006.01) | |

(52) U.S. Cl.
CPC ...... *C08F 290/067* (2013.01); *A61C 13/0013* (2013.01); *A61C 13/01* (2013.01); *B33Y 70/00* (2014.12); *C08G 18/246* (2013.01); *C08G 18/4213* (2013.01); *C08G 18/4238* (2013.01); *C08G 18/44* (2013.01); *C08G 18/6755* (2013.01); *C08G 18/755* (2013.01); *A61C 7/08* (2013.01); *B29C 64/124* (2017.08); *B29K 2033/04* (2013.01); *B29L 2031/7536* (2013.01); *B33Y 10/00* (2014.12); *B33Y 80/00* (2014.12)

(58) Field of Classification Search
CPC .... C08G 18/4213; C08G 18/44; C08G 18/07; C08G 18/55; C08G 18/6755; C08G 18/246; C08G 18/4238; B33Y 70/00; B33Y 10/00; B33Y 80/00; C08F 290/067; C08F 290/1812; C08F 290/1818; C08F 290/1811; A61C 7/002; A61C 7/08; A61C 13/01; A61C 13/0013; B29L 2031/7536; B29K 2033/04; B29C 64/124
USPC ................. 522/64, 6, 189, 184, 71, 1; 520/1
See application file for complete search history.

(56) References Cited

U.S. PATENT DOCUMENTS

| | | |
|---|---|---|
| 4,300,886 A | 11/1981 | Süling et al. |
| 2012/0021383 A1 | 1/2012 | Skaria et al. |
| 2014/0167300 A1 | 6/2014 | Lee |
| 2016/0184189 A1 | 6/2016 | Hagiwara et al. |
| 2017/0173872 A1 | 6/2017 | McCall et al. |
| 2018/0244831 A1 | 8/2018 | Hirata et al. |

(Continued)

FOREIGN PATENT DOCUMENTS

| | | |
|---|---|---|
| EP | 3 813 764 A | 5/2021 |
| JP | 56-144478 A | 11/1981 |

(Continued)

OTHER PUBLICATIONS

International Search Report dated Dec. 24, 2019 in PCT/JP2019/039386 filed Oct. 4, 2019, 2 pages.

(Continued)

*Primary Examiner* — Jessica Whiteley
(74) *Attorney, Agent, or Firm* — Oblon, McClelland, Maier & Neustadt, L.L.P.

(57) ABSTRACT

The present invention provides a resin composition for optical shaping that, with its low viscosity, enables easy stereolithographical fabrication of an object, and that can produce an object having desirable toughness and desirable water resistance, particularly for dental mouthpieces and denture base materials. The present invention relates to a resin composition for optical shaping comprising a urethanized (meth)acrylic compound (A) and a photopolymerization initiator (B), the urethanized (meth)acrylic compound (A) being a (meth)acrylate containing at least one polyol moiety and a urethane bond per molecule, said at least one polyol moiety being selected from the group consisting of a polyester, a polycarbonate, a polyurethane, and a polyether each having a structure derived from a C4 to C18 aliphatic chain diol unit (a) having a branched structure.

13 Claims, No Drawings

(56) References Cited

U.S. PATENT DOCUMENTS

2021/0024682 A1* 1/2021 Suzuki ................. C08G 18/755
2021/0361389 A1* 11/2021 Mac Murray ....... B29C 71/0009

FOREIGN PATENT DOCUMENTS

| | | |
|---|---|---|
| JP | 60-247515 A | 12/1985 |
| JP | H0841147 A | 2/1996 |
| JP | H0859759 A | 3/1996 |
| JP | 2000-159621 A | 6/2000 |
| JP | 2010-155926 A | 7/2010 |
| JP | 2015-38166 A | 2/2015 |
| JP | 2015-43793 A | 3/2015 |
| JP | 2015-232080 A | 12/2015 |
| JP | 2016-145275 A | 8/2016 |
| JP | 2016-525150 A | 8/2016 |
| JP | 2019-1939 A | 1/2019 |
| JP | 2019-199448 A | 11/2019 |
| WO | WO 2014/172716 A1 | 10/2014 |
| WO | WO 2017/047615 A1 | 3/2017 |
| WO | WO 2018/038056 A1 | 3/2018 |
| WO | WO 2019/189566 A1 | 10/2019 |
| WO | WO-2019189566 A1 * 10/2019 | ............. A61K 6/893 |
| WO | WO-2020003133 A1 * 1/2020 | ............... A61C 7/08 |

OTHER PUBLICATIONS

Extended European Search Report dated May 31, 2022 in European Patent Application No. 19869907.6, 10 pages.

* cited by examiner

RESIN COMPOSITION FOR OPTICAL SHAPING

TECHNICAL FIELD

The present invention relates to a resin composition for optical shaping. Specifically, the present invention relates to a resin composition that, with its low viscosity, enables easy stereolithographical fabrication of an object (particularly by bottom-up vat stereolithography) while ensuring desirable toughness and water resistance. A resin composition of the present invention is particularly suited for dental mouthpieces and denture base materials.

BACKGROUND ART

Patent Literature 1 discloses a photo-solidification technique, a method that produces a solid object through repeated exposure of controlled, necessary amounts of light energy to a liquid photocurable resin to cure the resin layer-by-layer as it is supplied onto the previously cured layer. Patent Literature 2 proposes a basic method for practical application of this technique, and, since its proposal, many other photo-solidification techniques have been proposed.

Vat stereolithography is a technique commonly used for optical fabrication of a solid object. In this technique, a computer-controlled ultraviolet laser is selectively applied to draw the desired pattern on the surface of a liquid photocurable resin composition placed in a vat. By being cured, the resin forms a layer of a predetermined thickness, and another cured layer is continuously formed on the cured layer by applying an ultraviolet laser to the liquid photocurable resin composition supplied onto the previously cured layer in an amount necessary to form a single layer. The layering process is repeated to produce a solid object of the desired shape. This technique has attracted great interest because it enables easy and precision production of the desired solid object in a relatively short time period, even when the product has a very complex shape. Traditionally, vat stereolithography has adopted a mode whereby an object being formed is lowered down in a vat filled with a large quantity of liquid photocurable resin composition. However, this type of vat stereolithography is being replaced by what is generally called the "bottom-up method", which is becoming mainstream because it requires less liquid photocurable resin composition and is less wasteful.

Solid objects produced by stereolithography are used in an increasingly wider range of applications, from simple concept models to more complex models such as test models and prototypes. This has created a demand for higher shape precision in these solid objects. In addition to satisfying such properties, these products are also required to have properties that are suited for their intended use. The field of dental materials is thought to greatly benefit from stereolithography because dental mouthpieces and denture bases require shapes that vary from patient to patient, aside from being complex in shape.

Various types of dental mouthpieces are available, including dental aligners attached to teeth for the correction of teeth alignment, oral appliances (OAs) worn during sleep for the treatment of sleep apnea, night guards attached to teeth to reduce tooth wear by clenching, and dental splints attached to teeth for the treatment of temporomandibular joint. In orthodontics, the use of dental mouthpieces has gained wide popularity over the last years because of aesthetics and detachability. Dental mouthpieces are also increasingly being used as appliances for the treatment of sleep apnea, which has attracted medical interest amongst other sleep disorders.

Denture base materials are materials used for the gum as a part of a denture attached to replace missing teeth. The demand for dentures has rapidly increased in recent years because of increasing ageing populations.

Common requirements for dental mouthpieces and denture base materials include toughness and water resistance. A loss of toughness leads to discomfort, or causes the impact of external forces and biting to directly transmit to the jawbones. Being prone to fractures is also problematic because it necessitates frequent replacement. A loss of water resistance makes these appliances practically useless as it causes reduction of mechanical properties, inability to deliver orthodontic forces or absorb shock, and weak fracture resistance.

Another consideration is that fabrication of dental mouthpieces and denture base materials typically requires taking an impression of the oral cavity. However, the procedure involves discomfort, and places a burden on patients, in addition to requiring high technical skills. Recent advances in digital technology has led to approaches that make use of an intraoral optical scan for taking an oral impression, and there have been attempts to apply stereolithography techniques for molding. For fabrication, photocurable resin compositions are used. As a rule, resin compositions that develop flexibility and water resistance are usually high in low-polarity monomers and low in curability, and cured products of such resin compositions tend to have poor mechanical strength. Particularly, in stereolithography, light is applied for only brief time periods, and the resin composition is exposed to oxygen as it is fabricated into an object layer-by-layer. This often leads to defects, notably insufficient curing. Indeed, it has been difficult to satisfy mechanical strength, flexibility, and water resistance at the same time. Resin compositions are also required to have a viscosity sufficient to enable fabrication. However, many of monomers that develop mechanical strength have high viscosity. Low-viscosity monomers usually have low boiling points, and use of low-viscosity monomers to achieve low viscosity creates an odor problem. The need for low-viscosity monomers is particularly high in bottom-up stereolithography because the bottom-up method uses only small amounts of liquid.

Against this background, various techniques are proposed that are intended to enable stereolithographical fabrication of a cured product having desirable flexibility and desirable mechanical strength. For example, Patent Literature 3 proposes a photocurable resin composition comprising a specific urethane-base oligomer and an acrylamide compound having a chain structure, and that excels in fabricability, flexibility, and mechanical strength. Patent Literature 4 proposes a photocurable resin composition comprising an acrylamide oligomer, and that has desirable curability and moisture resistance.

CITATION LIST

Patent Literature

Patent Literature 1: JP S56(1981)-144478A
Patent Literature 2: JP S60(1985)-247515 A
Patent Literature 3: WO2018/038056
Patent Literature 4: WO2017/047615

SUMMARY OF INVENTION

Technical Problem

Patent Literature 3 does not contain specific descriptions of the photocurable resin composition concerning water resistance. Patent Literature 4 is silent about fabricability in bottom-up stereolithography.

It is accordingly an object of the present invention to provide a resin composition for optical shaping that, with its low viscosity, enables easy stereolithographical fabrication of an object (particularly by bottom-up vat stereolithography), and that can produce a cured product having desirable toughness and desirable water resistance. Another object of the present invention is to provide a resin composition for optical shaping particularly suited for dental mouthpieces and denture base materials.

Solution to Problem

Specifically, the present invention relates to the following.
[1] A resin composition for optical shaping, comprising a urethanized (meth)acrylic compound (A) and a photopolymerization initiator (B),
the urethanized (meth)acrylic compound (A) being a (meth)acrylate containing at least one polyol moiety and a urethane bond per molecule, said at least one polyol moiety being selected from the group consisting of a polyester, a polycarbonate, a polyurethane, and a polyether each having a structure derived from a C4 to C18 aliphatic chain diol unit (a) having a branched structure.
[2] The resin composition for optical shaping according to [1], wherein the urethanized (meth)acrylic compound (A) is a (meth)acrylate containing, per molecule, at least one polyol moiety selected from the group consisting of: a polyester having a structure derived from a C4 to C18 aliphatic chain dicarboxylic acid and/or aromatic dicarboxylic acid unit (b) having no branched structure; and a polycarbonate having a structure derived from a C4 to C18 aliphatic chain diol unit (c) having no branched structure.
[3] The resin composition for optical shaping according to [1] or [2], wherein the polyol moiety contained in the urethanized (meth)acrylic compound (A) has a weight-average molecular weight of 400 to 10,000.
[4] The resin composition for optical shaping according to any one of [1] to [3], wherein the urethanized (meth)acrylic compound (A) has a weight-average molecular weight of 1,000 to 20,000.
[5] The resin composition for optical shaping according to any one of [1] to [4], further comprising a (meth)acrylic acid ester compound (C) having a viscosity of 1,000 mPa·s or less and a boiling point at normal pressure of 280° C. or more, and/or a (meth)acrylamide compound (D) having a viscosity of 1,000 mPa·s or less and a boiling point at normal pressure of 200° C. or more.
[6] The resin composition for optical shaping according to [5], wherein the (meth)acrylic acid ester compound (C) having a viscosity of 1,000 mPa·s or less and a boiling point at normal pressure of 280° C. or more, and/or the (meth)acrylamide compound (D) having a viscosity of 1,000 mPa·s or less and a boiling point at normal pressure of 200° C. or more are monofunctional.
[7] The resin composition for optical shaping according to [5] or [6], wherein the (meth)acrylic acid ester compound (C) having a viscosity of 1,000 mPa·s or less and a boiling point at normal pressure of 280° C. or more is an aliphatic (meth)acrylic acid ester having a hydrocarbon group having 11 to 18 carbon atoms.
[8] The resin composition for optical shaping according to [7], wherein the aliphatic (meth)acrylic acid ester having a hydrocarbon group having 11 to 18 carbon atoms is at least one selected from the group consisting of lauryl (meth)acrylate, tridecyl (meth)acrylate, tetradecyl (meth)acrylate, pentadecyl (meth)acrylate, cetyl (meth)acrylate, oleyl (meth)acrylate, and isobornylcyclohexyl (meth)acrylate.
[9] A dental mouthpiece comprising a cured product of the resin composition for optical shaping of any one of [1] to [8].
[10] A denture base material comprising a cured product of the resin composition for optical shaping of any one of [1] to [8].
[11] A method for stereolithographically producing a three-dimensional object with the resin composition for optical shaping of any one of [1] to [8].

Advantageous Effects of Invention

A resin composition for optical shaping of the present invention has low viscosity, enabling easy stereolithographical fabrication of an object (particularly by bottom-up vat stereolithography), and can produce a cured product having desirable toughness and desirable water resistance. This makes a resin composition for optical shaping of the present invention suited for a variety of dental materials, particularly dental mouthpieces and denture base materials.

DESCRIPTION OF EMBODIMENTS

A resin composition for optical shaping of the present invention comprises a urethanized (meth)acrylic compound (A) and a photopolymerization initiator (B), the urethanized (meth)acrylic compound (A) being a (meth)acrylate containing at least one polyol moiety and a urethane bond per molecule, said at least one polyol moiety being selected from the group consisting of a polyester, a polycarbonate, a polyurethane, and a polyether each having a structure derived from a C4 to C18 aliphatic chain diol unit (a) having a branched structure. In the present specification, the upper limits and lower limits of numeric ranges (for example, ranges of contents of components, ranges of values calculated from components, and numeric ranges of physical properties) can be combined appropriately. In the present specification, the numeric values represented by symbols in various formulae also can be combined as appropriate.

Urethanized (Meth)Acrylic Compound (A)

A urethanized (meth)acrylic compound (A) is used to impart curability and low viscosity to a resin composition for optical shaping of the present invention, and to impart toughness and water resistance to a cured product of the resin composition for optical shaping.

A feature of the urethanized (meth)acrylic compound (A) is that it contains the aforementioned polyol moiety and a urethane bond. For example, the urethanized (meth)acrylic compound (A) can be synthesized with ease through addition reaction of:
a polyol having a structure derived from the C4 to C18 aliphatic chain diol unit (a) having a branched structure;
a compound having an isocyanate group (—NCO); and
a (meth)acrylate having a hydroxyl group (—OH).

The urethanized (meth)acrylic compound (A) may contain, per molecule, a polyester polyol moiety having a structure derived from a C4 to C18 aliphatic chain diol unit (a) having a branched structure, together with other polyol moieties (for example, a polyester polyol moiety having a structure derived from a C4 to C18 aliphatic chain dicarboxylic acid and/or aromatic dicarboxylic acid unit (b) having no branched structure), via a diisocyanate group. The urethanized (meth)acrylic compound (A) may be used alone, or two or more thereof may be used in combination.

It is important that the urethanized (meth)acrylic compound (A) contain, in addition to a urethane bond, a polyol moiety selected from the group consisting of a polyester, a polycarbonate, a polyurethane, and a polyether each having a structure derived from a C4 to C18 aliphatic chain diol unit (a) having a branched structure, as mentioned above. In view of fabricability, toughness, and water resistance, the urethanized (meth)acrylic compound (A) is preferably a compound having, per molecule, (i) a structure derived from a C4 to C18 aliphatic chain dicarboxylic acid and/or aromatic dicarboxylic acid unit (b) having no branched structure, and/or (ii) a structure derived from a C4 to C18 aliphatic chain diol unit (c) having no branched structure, in addition to a structure derived from the aliphatic chain diol unit (a). In view of fabricability, toughness, and water resistance, the urethanized (meth)acrylic compound (A) is more preferably a (meth)acrylate additionally containing, per molecule, at least one polyol moiety selected from the group consisting of: a polyester having a structure derived from a C4 to C18 aliphatic chain dicarboxylic acid and/or aromatic dicarboxylic acid unit (b) having no branched structure; and a polycarbonate having a structure derived from a C4 to C18 aliphatic chain diol unit (c) having no branched structure. The polyester is, for example, a copolymer having a structure derived from a C4 to C18 aliphatic chain diol unit (a) having a branched structure, and a structure derived from a C4 to C18 aliphatic chain dicarboxylic acid and/or aromatic dicarboxylic acid unit (b) having no branched structure. The polycarbonate is, for example, a polymer having a structure derived from a C4 to C18 aliphatic chain diol unit (a) having a branched structure, and a structure derived from a C4 to C18 aliphatic chain diol unit (c) having no branched structure. The polyurethane may be, for example, a polycondensate of a diisocyanate compound and a structure derived from a C4 to C18 aliphatic chain diol unit (a) having a branched structure. The polyether may be, for example, a polyether having a structure derived from a C4 to C18 aliphatic chain diol unit (a) having a branched structure. For improved toughness and water resistance, the urethanized (meth)acrylic compound (A) preferably contains a polyester and a polycarbonate as polyol moieties.

Examples of the C4 to C18 aliphatic chain diol unit (a) having a branched structure include 2-methyl-1,3-propanediol, 2,2-diethyl-1,3-propanediol, 1,3-butanediol, 2-methyl-1,4-butanediol, neopentyl glycol, 3-methyl-1,5-pentanediol, 2-methyl-1,8-octanediol, 2,7-dimethyl-1,8-octanediol, 2-methyl-1,9-nonanediol, 2,8-dimethyl-1,9-nonanediol, 2-methyl-1,10-decanediol, 2,9-dimethyl-1,10-decanediol, 2-methyl-1,11-undecanediol, 2,10-dimethyl-1,11-undecanediol, 2-methyl-1,12-dodecanediol, 2,11-dimethyl-1,12-dodecanediol, 2-methyl-1,13-tridecanediol, 2,12-dimethyl-1,13-tridecanediol, 2-methyl-1,14-tetradecanediol, 2,13-dimethyl-1,14-tetradecanediol, 2-methyl-1,15-pentadecanediol, 2,14-dimethyl-1,15-pentadecanediol, 2-methyl-1,16-hexadecanediol, and 2,15-dimethyl-1,16-hexadecanediol. In view of providing a resin composition for optical shaping having desirable curability and low viscosity, the polyol components used are preferably C5 to C12 aliphatic diols having a methyl-group side chain, for example, such as 2-methyl-1,4-butanediol, 3-methyl-1,5-pentanediol, 2-methyl-1,8-octanediol, 2,7-dimethyl-1,8-octanediol, 2-methyl-1,9-nonanediol, and 2,8-dimethyl-1,9-nonanediol. The polyol components are more preferably 2-methyl-1,4-butanediol, 3-methyl-1,5-pentanediol, 2-methyl-1,8-octanediol, and 2,7-dimethyl-1,8-octanediol, even more preferably 3-methyl-1,5-pentanediol, and 2-methyl-1,8-octanediol.

Examples of the C4 to C18 aliphatic chain dicarboxylic acid and/or aromatic dicarboxylic acid unit (b) having no branched structure include succinic acid, maleic acid, fumaric acid, glutaric acid, adipic acid, pimelic acid, suberic acid, azelaic acid, sebacic acid, dodecanedioic acid, undecanedioic acid, tridecanedioic acid, tetradecanedioic acid, pentadecanedioic acid, hexadecanedioic acid, phthalic acid, terephthalic acid, and isophthalic acid. In view of improving the curability of the resin composition for optical shaping and providing a cured product having desirable water resistance, preferred are adipic acid, pimelic acid, suberic acid, azelaic acid, sebacic acid, terephthalic acid, and isophthalic acid, more preferably adipic acid, sebacic acid, and isophthalic acid.

Examples of the C4 to C18 aliphatic chain diol unit (c) having no branched structure include 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,15-pentadecanediol, 1,16-hexadecanediol, 1,17-heptadecanediol, and 1,18-octadecanediol. In view of improving the curability of the resin composition for optical shaping and providing a cured product having desirable water resistance, preferred are 1,6-hexanediol, 1,8-octanediol, 1,9-nonanediol, 1,10-decanediol, 1,11-undecanediol, and 1,12-dodecanediol, more preferably 1,6-hexanediol, 1,8-octanediol, 1,9-nonanediol, and 1,10-decanediol, even more preferably 1,6-hexanediol and 1,9-nonanediol.

In view of viscosity and strength, the polyol moiety in the urethanized (meth)acrylic compound (A) has a weight-average molecular weight (Mw) of preferably 400 to 10,000, more preferably 400 to 7,500, even more preferably 600 to 5,000, particularly preferably 800 to 3,000. As used herein, "weight-average molecular weight (Mw)" means a weight-average molecular weight determined in terms of polystyrene by gel permeation chromatography (GPC).

Examples of the compound having an isocyanate group include hexamethylene diisocyanate (HDI), tolylene diisocyanate (TDI), xylylene diisocyanate (XDI), diphenylmethane diisocyanate (MDI), isophorone diisocyanate (IPDI), trimethylhexamethylene diisocyanate (TMHMDI), tricyclodecane diisocyanate (TCDDI), and adamantane diisocyanate (ADI).

Examples of the (meth)acrylate having a hydroxyl group include hydroxy(meth)acrylate compounds such as 2-hydroxyethyl (meth)acrylate, 2-hydroxypropyl (meth)acrylate, 2-hydroxybutyl (meth)acrylate, 6-hydroxyhexyl (meth)acrylate, 10-hydroxydecyl (meth)acrylate, 3-chloro-2-hydroxypropyl (meth)acrylate, 2-hydroxy-3-phenoxypropyl (meth)acrylate, glycerin mono(meth)acrylate, N-hydroxyethyl (meth)acrylamide, N,N-bis(2-hydroxyethyl) (meth)acrylamide, 2-hydroxy-3-acryloyloxypropyl (meth)acrylate, 2,2-bis[4-[3-(meth)acryloyloxy-2-hydroxypropoxy]phenyl] propane, 1,2-bis[3-(meth)acryloyloxy-2-hydroxypropoxy] ethane, pentaerythritol tri(meth)acrylate, and dipentaerythritol tri(meth)acrylate or dipentaerythritol tetra(meth)acrylate.

The addition reaction between the compound having an isocyanate group and the (meth)acrylate having a hydroxyl group is not particularly limited, and may be carried out according to known methods.

The urethanized (meth)acrylic compound (A) produced by the reaction is, for example, any combination of at least one polyol selected from the group consisting of a polyester, a polycarbonate, a polyurethane, and a polyether; a compound having an isocyanate group; and a (meth)acrylate having a hydroxyl group.

In view of viscosity and toughness, the weight-average molecular weight (Mw) of urethanized (meth)acrylic compound (A) is preferably 1,000 to 20,000, more preferably 1,250 to 15,000, even more preferably 1,500 to 10,000.

A resin composition for optical shaping of the present invention comprises preferably 10 to 99 mass % of urethanized (meth)acrylic compound (A) relative to the total amount of the urethanized (meth)acrylic compound (A), a (meth)acrylic acid ester compound (C) having a viscosity of 1,000 mPa·s or less, and a boiling point at normal pressure of 280° C. or more, and a (meth)acrylamide compound (D) having a viscosity of 1,000 mPa·s or less, and a boiling point at normal pressure of 200° C. or more. In view of improving fabricability and providing a cured product having improved toughness and water resistance, the content of urethanized (meth)acrylic compound (A) is more preferably 30 to 95 mass %, even more preferably 50 to 90 mass %. As used herein, "normal pressure" means atmospheric pressure.

Photopolymerization Initiator (B)

The photopolymerization initiator (B) used in the present invention may be selected from common photopolymerization initiators used in industry, preferably from photopolymerization initiators used in dentistry.

Examples of the photopolymerization initiator (B) include (bis)acylphosphine oxides, thioxanthones or quaternary ammonium salts of thioxanthones, ketals, α-diketones, coumarins, anthraquinones, benzoin alkyl ether compounds, and α-aminoketone compounds. The photopolymerization initiator (B) may be used alone, or two or more thereof may be used in combination.

Preferably, the photopolymerization initiator (B) is at least one selected from the group consisting of (bis)acylphosphine oxides and α-diketones. In this way, a resin composition for optical shaping can be obtained that has desirable photocurability both in the ultraviolet and visible regions, and that shows sufficient photocurability even when the light source is a laser, a halogen lamp, a light emitting diode (LED), or a xenon lamp.

Examples of acylphosphine oxides in the (bis)acylphosphine oxides include 2,4,6-trimethylbenzoyldiphenylphosphine oxide, 2,6-dimethoxybenzoyldiphenylphosphine oxide, 2,6-dichlorobenzoyldiphenylphosphine oxide, 2,4,6-trimethylbenzoylmethoxyphenylphosphine oxide, 2,4,6-trimethylbenzoylethoxyphenylphosphine oxide, 2,3,5,6-tetramethylbenzoyldiphenylphosphine oxide, benzoyl di(2,6-dimethylphenyl)phosphonate, sodium salts of 2,4,6-trimethylbenzoylphenylphosphine oxide, potassium salts of 2,4,6-trimethylbenzoylphenylphosphine oxide, and ammonium salts of 2,4,6-trimethylbenzoyldiphenylphosphine oxide. Examples of bisacylphosphine oxides include bis(2,6-dichlorobenzoyl)phenylphosphine oxide, bis(2,6-dichlorobenzoyl)-2,5-dimethylphenylphosphine oxide, bis(2,6-dichlorobenzoyl)-4-propylphenylphosphine oxide, bis(2,6-dichlorobenzoyl)-1-naphthylphosphine oxide, bis(2,6-dimethoxybenzoyl)phenylphosphine oxide, bis(2,6-dimethoxybenzoyl)-2,4,4-trimethylpentylphosphine oxide, bis(2,6-dimethoxybenzoyl)-2,5-dimethylphenylphosphine oxide, bis(2,4,6-trimethylbenzoyl)phenylphosphine oxide, and bis(2,5,6-trimethylbenzoyl)-2,4,4-trimethylpentylphosphine oxide. Other examples include the compounds mentioned in JP 2000-159621 A.

Among these (bis)acylphosphine oxides, particularly preferred as photopolymerization initiator (B) are 2,4,6-trimethylbenzoyldiphenylphosphine oxide, 2,4,6-trimethylbenzoylmethoxyphenylphosphine oxide, bis(2,4,6-trimethylbenzoyl)phenylphosphine oxide, and sodium salts of 2,4,6-trimethylbenzoylphenylphosphine oxide.

Examples of the α-diketones include diacetyl, benzyl, camphorquinone, 2,3-pentadione, 2,3-octadione, 9,10-phenanthrenequinone, 4,4'-oxybenzyl, and acenaphthenequinone. Camphorquinone is particularly preferred when the light source used is a visible-light source.

The content of the photopolymerization initiator (B) in a resin composition for optical shaping of the present invention is not particularly limited, as long as the present invention can exhibit its effects. However, in view of curability and other properties of the resin composition for optical shaping, the content of photopolymerization initiator (B) is preferably 0.01 to 20 parts by mass relative to total 100 parts by mass of the polymerizable compounds. When the content of photopolymerization initiator (B) is less than 0.01 parts by mass, polymerization may not sufficiently proceed to form a solid object. The content of photopolymerization initiator (B) is more preferably 0.05 parts by mass or more, even more preferably 0.1 parts by mass or more relative to total 100 parts by mass of the polymerizable compounds. When the content of photopolymerization initiator (B) is more than 20 parts by mass, the photopolymerization initiator (B) may precipitate out of the resin composition for optical shaping when the solubility of the photopolymerization initiator itself is low. The content of photopolymerization initiator (B) is more preferably 15 parts by mass or less, even more preferably 10 parts by mass or less, particularly preferably 5.0 parts by mass or less relative to total 100 parts by mass of the polymerizable compounds.

Preferably, the resin composition for optical shaping of the present invention further comprises a (meth)acrylic acid ester compound (C) having a viscosity of 1,000 mPa·s or less and a boiling point at normal pressure of 280° C. or more, and/or a (meth)acrylamide compound (D) having a viscosity of 1,000 mPa·s or less and a boiling point at normal pressure of 200° C. or more. More preferably, the (meth)acrylic acid ester compound (C) having a viscosity of 1,000 mPa·s or less and a boiling point at normal pressure of 280° C. or more, and/or a (meth)acrylamide compound (D) having a viscosity of 1,000 mPa·s or less and a boiling point at normal pressure of 200° C. or more are monofunctional. As used herein, "viscosity" is a viscosity measured with a Brookfield rotary viscometer at 25° C. Measurement conditions such as time and rotational speed are appropriately adjusted according to the predicted viscosity range of measurement. The Brookfield rotary viscometer may be a commercially available product (for example, a Model B rotary viscometer (Model: BL) manufactured by Tokimec Inc.). As used herein, "boiling point at normal pressure" is a measured value by atmospheric distillation. For compounds for which boiling points at atmospheric pressure are not observable, a measured value of boiling point at reduced pressure by vacuum distillation is converted into a boiling point at normal pressure using a boiling point vs. pressure chart (The Science of Petroleum, Vol. II. p. 1281 (1938)).

(Meth)Acrylic Acid Ester Compound (C) Having a Viscosity of 1,000 mPa·s or Less and a Boiling Point at Normal Pressure of 280° C. or More In a resin composition for optical shaping of the present invention, the (meth)acrylic acid ester compound (C) having a viscosity of 1,000 mPa·s or less and a boiling point at normal pressure of 280° C. or more (hereinafter, also referred to simply as "(meth)acrylic acid ester compound (C)") can lower the viscosity of the resin composition for optical shaping, and is used to impart water resistance to the cured product. With a boiling point at normal pressure of 280° C. or more, a resin composition for optical shaping of the present invention becomes less likely to produce an unpleasant odor. The boiling point at normal pressure of (meth)acrylic acid ester compound (C) is preferably 300° C. or more, more preferably 320° C. or more. The viscosity of (meth)acrylic acid ester compound (C) is preferably 500 mPa·s or less, more preferably 200 mPa·s or less. The (meth)acrylic acid ester compound (C) may be used alone, or two or more thereof may be used in combination.

Examples of the (meth)acrylic acid ester compound (C) in the present invention include monofunctional (meth)acrylic acid ester compounds having one (meth)acryloyl group, and polyfunctional (meth)acrylic acid ester compounds having a plurality of (meth)acryloyl groups. In view of obtaining a cured product having desirable flexibility, monofunctional (meth)acrylic acid ester compounds are more preferred. In view of water resistance, preferred as monofunctional (meth)acrylic acid ester compounds are aliphatic (meth)acrylic acid esters having a hydrocarbon group having 3 to 18 carbon atoms, more preferably aliphatic (meth)acrylic acid esters having a hydrocarbon group having 11 to 18 carbon atoms. The hydrocarbon group may be linear or branched. Examples of the hydrocarbon group include alkyl and alkenyl. The hydrocarbon group is preferably alkyl. More preferably, the hydrocarbon group has 12 to 16 carbon atoms. The hydrocarbon group may have a substituent, or may be unsubstituted. Examples of the substituent include an amino group, a hydroxyl group, an oxo group, an alkoxy group (for example, 1 to 6 carbon atoms), an amide group, an acyl group (for example, 1 to 6 carbon atoms), an acyloxy group (for example, 1 to 6 carbon atoms), a cyano group, and a nitro group. The substituent is preferably a hydroxyl group. Preferably, the (meth)acrylic acid ester compound (C) does not contain a urethane bond.

Examples of the monofunctional (meth)acrylic acid ester compounds include:

monofunctional aliphatic (meth)acrylic acid esters such as undecyl (meth)acrylate, lauryl (meth)acrylate, tridecyl (meth)acrylate, tetradecyl (meth)acrylate, pentadecyl (meth)acrylate, cetyl (meth)acrylate, palmitoleyl (meth)acrylate, heptadecyl (meth)acrylate, oleyl (meth)acrylate, stearyl (meth)acrylate, isostearyl (meth)acrylate, 4-hydroxybutyl (meth)acrylate, 6-hydroxyhexyl (meth)acrylate, 10-hydroxydecyl (meth)acrylate, glycerol mono(meth)acrylate, erythritol mono(meth)acrylate, and isobornylcyclohexyl (meth)acrylate; and monofunctional aromatic(meth)acrylic acid esters such as o-phenylphenol (meth)acrylate, m-phenylphenol (meth)acrylate, p-phenylphenol (meth)acrylate, methoxylated-o-phenylphenol (meth)acrylate, methoxylated-m-phenylphenol (meth)acrylate, methoxylated-p-phenylphenol (meth)acrylate, ethoxylated-o-phenylphenol (meth)acrylate, ethoxylated-m-phenylphenol (meth)acrylate, ethoxylated-p-phenylphenol (meth)acrylate, propoxylated-o-phenylphenol (meth)acrylate, propoxylated-m-phenylphenol (meth)acrylate, propoxylated-p-phenylphenol (meth)acrylate, butoxylated-o-phenylphenol (meth)acrylate, butoxylated-m-phenylphenol (meth)acrylate, butoxylated-p-phenylphenol (meth)acrylate, o-phenoxybenzyl (meth)acrylate, m-phenoxybenzyl (meth)acrylate, p-phenoxybenzyl (meth)acrylate, 2-(o-phenoxyphenyl)ethyl (meth)acrylate, 2-(m-phenoxyphenyl)ethyl (meth)acrylate, 2-(p-phenoxyphenyl)ethyl (meth)acrylate, 3-(o-phenoxyphenyl)propyl (meth)acrylate, 3-(m-phenoxyphenyl)propyl (meth)acrylate, 3-(p-phenoxyphenyl)propyl (meth)acrylate, 4-(o-phenoxyphenyl)butyl (meth)acrylate, 4-(m-phenoxyphenyl)butyl (meth)acrylate, 4-(p-phenoxyphenyl)butyl (meth)acrylate, 5-(o-phenoxyphenyl)pentyl (meth)acrylate, 5-(m-phenoxyphenyl)pentyl (meth)acrylate, 5-(p-phenoxyphenyl)pentyl (meth)acrylate, 6-(o-phenoxyphenyl)hexyl (meth)acrylate, 6-(m-phenoxyphenyl)hexyl (meth)acrylate, and 6-(p-phenoxyphenyl)hexyl (meth)acrylate. These may be used alone, or two or more thereof may be used in combination. In view of improving the curability of a resin composition for optical shaping, and the toughness and water resistance of a cured product, the monofunctional (meth)acrylic acid ester compounds are preferably lauryl (meth)acrylate, tridecyl (meth)acrylate, tetradecyl (meth)acrylate, pentadecyl (meth)acrylate, cetyl (meth)acrylate, oleyl (meth)acrylate, m-phenylphenol (meth)acrylate, m-phenoxybenzyl (meth)acrylate, and isobornylcyclohexyl (meth)acrylate, more preferably lauryl (meth)acrylate, cetyl (meth)acrylate, and isobornylcyclohexyl (meth)acrylate, even more preferably lauryl (meth)acrylate and isobornylcyclohexyl (meth)acrylate, most preferably isobornylcyclohexyl (meth)acrylate.

Examples of the polyfunctional (meth)acrylic acid ester compounds include aromatic bifunctional (meth)acrylic acid ester compounds, aliphatic bifunctional (meth)acrylic acid ester compounds, and tri- and higher-functional (meth)acrylic acid ester compounds.

Examples of the aromatic bifunctional (meth)acrylic acid ester compounds include 2,2-bis(4-(meth)acryloyloxyethoxyphenyl)propane, 2,2-bis(4-(meth)acryloyloxypolyethoxyphenyl)propane, 2,2-bis(4-(meth)acryloyloxydiethoxyphenyl)propane, 2,2-bis(4-(meth)acryloyloxytetraethoxyphenyl)propane, 2,2-bis(4-(meth)acryloyloxypentaethoxyphenyl)propane, 2,2-bis(4-(meth)acryloyloxydipropoxyphenyl)propane, 2-(4-(meth)acryloyloxydiethoxyphenyl)-2-(4-(meth)acryloyloxyethoxyphenyl)propane, 2-(4-(meth)acryloyloxydiethoxyphenyl)-2-(4-(meth)acryloyloxytriethoxyphenyl)propane, 2-(4-(meth)acryloyloxydipropoxyphenyl)-2-(4-(meth)acryloyloxytriethoxyphenyl)propane, 2,2-bis(4-(meth)acryloyloxypropoxyphenyl)propane, 2,2-bis(4-(meth)acryloyloxyisopropoxyphenyl)propane, and 1,4-bis(2-(meth)acryloyloxyethyl)pyromellitate.

Examples of the aliphatic bifunctional (meth)acrylic acid ester compounds include glycerol di(meth)acrylate, ethylene glycol di(meth)acrylate, diethylene glycol di(meth)acrylate, triethylene glycol di(meth)acrylate, propylene glycol di(meth)acrylate, butylene glycol di(meth)acrylate, neopentyl glycol di(meth)acrylate, polyethylene glycol di(meth)acrylate, 1,3-butanediol di(meth)acrylate, 1,4-butanediol di(meth)acrylate, 1,6-hexanediol di(meth)acrylate, 2-ethyl-1,6-hexanediol di(meth)acrylate, 1,9-nonanediol di(meth)acrylate, 1,10-decanediol di(meth)acrylate, and 1,2-bis(3-methacryloyloxy-2-hydroxypropoxy)ethane.

Examples of the tri- and higher-functional (meth)acrylic acid ester compounds include trimethylolpropane tri(meth)acrylate, trimethylolethane tri(meth)acrylate, trimethylolmethane tri(meth)acrylate, pentaerythritol tri(meth)acrylate, pentaerythritol tetra(meth)acrylate, and dipentaerythritol penta(meth)acrylate.

A resin composition for optical shaping of the present invention comprises preferably 1.0 to 80 mass % of (meth)acrylic acid ester compound (C) relative to the total amount of the urethanized (meth)acrylic compound (A), the (meth)acrylic acid ester compound (C), and the (meth)acrylamide compound (D) having a viscosity of 1,000 mPa·s or less and a boiling point at normal pressure of 200° C. or more. In view of improving fabricability and providing a cured product having improved toughness and water resistance, the content of (meth)acrylic acid ester compound (C) is more preferably 5 to 70 mass %, even more preferably 10 to 60 mass %.

(Meth)Acrylamide Compound (D) Having a Viscosity of 1,000 mPa·s or Less and a Boiling Point at Normal Pressure of 200° C. or More In a resin composition for optical shaping of the present invention, the (meth)acrylamide compound (D) having a viscosity of 1,000 mPa·s or less and a boiling point at normal pressure of 200° C. or more (hereinafter, also referred to simply as "(meth)acrylamide compound (D)") can lower the viscosity of the resin composition for optical shaping, and is used to impart curability to the resin composition for optical shaping. The boiling point at normal pressure of (meth) acrylamide compound (D) is preferably 225° C. or more, more preferably 250° C. or more. With a boiling point at normal pressure of 250° C. or more, a resin composition for optical shaping of the present invention becomes less likely to produce an unpleasant odor. The viscosity of (meth) acrylamide compound (D) is preferably 500 mPa·s or less, more preferably 200 mPa·s or less. The (meth)acrylamide compound (D) may be used alone, or two or more thereof may be used in combination.

Examples of the (meth)acrylamide compound (D) in the present invention include N,N-dimethyl(meth)acrylamide, N,N-diethyl(meth)acrylamide, N,N-di-n-propyl(meth)acrylamide, N-isopropyl(meth)acrylamide, N-t-butyl(meth)acrylamide, N-t-octylacrylamide, N,N-di-n-butyl(meth)acrylamide, N,N-di-n-hexyl(meth)acrylamide, N,N-di-n-octyl (meth)acrylamide, N,N-di-2-ethylhexyl(meth)acrylamide, N-(2-hydroxyethyl)(meth)acrylamide, N,N-bis(2-hydroxyethyl)(meth)acrylamide, N-acryloylmorpholine, N,N-dimethylaminoethyl(meth)acrylamide, N,N-diethylaminoethyl (meth)acrylamide, N,N-dipropylaminoethyl(meth) acrylamide, N,N-dibutylaminoethyl(meth)acrylamide, N,N-dimethylaminopropyl(meth)acrylamide, N,N-diethylaminopropyl(meth)acrylamide, N,N-dipropylaminopropyl(meth)acrylamide, N,N-dibutylaminopropyl(meth)acrylamide, N,N-dimethylaminobutyl(meth)acrylamide, N,N-diethylaminobutyl(meth)acrylamide, N,N-dipropylaminobutyl(meth)acrylamide, and N,N-dibutylaminobutyl(meth)acrylamide. These may be used alone, or two or more thereof may be used in combination. In view of improving the viscosity and curability of the resin composition for optical shaping, and providing a cured product having improved water resistance, the (meth)acrylamide compound (D) is more preferably N,N-dimethyl (meth)acrylamide, N,N-diethyl(meth)acrylamide, N-acryloylmorpholine, N,N-dimethylaminoethyl(meth) acrylamide, or N,N-diethylaminoethyl(meth)acrylamide, even more preferably N,N-diethyl(meth)acrylamide or N-acryloylmorpholine.

The content of (meth)acrylamide compound (D) in a resin composition for optical shaping of the present invention is preferably 1 to 60 mass %, more preferably 2.5 to 40 mass %, even more preferably 5 to 20 mass % relative to the total amount of the urethanized (meth)acrylic compound (A), the (meth)acrylic acid ester compound (C), and the (meth) acrylamide compound (D).

A resin composition for optical shaping of the present invention may comprise polymerizable compounds other than the urethanized (meth)acrylic compound (A). The polymerizable compounds may consist essentially of urethanized (meth)acrylic compound (A), or essentially of urethanized (meth)acrylic compound (A) and (meth)acrylic acid ester compound (C), or essentially of urethanized (meth)acrylic compound (A), (meth)acrylic acid ester compound (C), and (meth)acrylamide compound (D). Here, essentially consisting of urethanized (meth)acrylic compound (A), (meth)acrylic acid ester compound (C), and (meth)acrylamide compound (D) means that the content of polymerizable compounds other than urethanized (meth) acrylic compound (A), (meth)acrylic acid ester compound (C), and (meth)acrylamide compound (D) is less than 10.0 mass %, preferably less than 5.0 mass %, more preferably less than 1.0 mass %, even more preferably less than 0.1 mass %, particularly preferably less than 0.01 mass % relative to the total amount of the polymerizable compounds contained in the resin composition for optical shaping.

A resin composition for optical shaping of the present invention is not particularly limited, as long as it contains the urethanized (meth)acrylic compound (A) and the photopolymerization initiator (B). For example, a resin composition for optical shaping of the present invention may contain components other than urethanized (meth)acrylic compound (A) and photopolymerization initiator (B). A resin composition for optical shaping of the present invention can be produced according to known methods.

A resin composition for optical shaping of the present invention may contain a polymerization accelerator (E) to improve photocurability, provided that addition of a polymerization accelerator is not against the intent and purpose of the present invention. Examples of the polymerization accelerator (E) include ethyl 4-(N,N-dimethylamino)benzoate, methyl 4-(N,N-dimethylamino)benzoate, n-butoxyethyl 4-(N,N-dimethylamino)benzoate, 2-(methacryloyloxy)ethyl 4-(N,N-dimethylamino)benzoate, 4-(N,N-dimethylamino) benzophenone, and butyl 4-(N,N-dimethylamino)benzoate. The polymerization accelerator (E) may be used alone, or two or more thereof may be used in combination. In view of imparting desirable curability to the resin composition for optical shaping, preferred is at least one selected from the group consisting of ethyl 4-(N,N-dimethylamino)benzoate, n-butoxyethyl 4-(N,N-dimethylamino)benzoate, and 4-(N, N-dimethylamino)benzophenone.

The resin composition for optical shaping of the present invention may further comprise a filler (F) mixed therein to adjust paste properties or to alter the surface properties or strength of a cured product of the resin composition for optical shaping. Examples of the filler (F) include organic fillers, inorganic fillers, and organic-inorganic composite fillers. The filler (F) may be used alone, or two or more thereof may be used in combination.

Examples of the organic fillers include polymethyl methacrylate, polyethyl methacrylate, methyl methacrylate-ethyl methacrylate copolymer, crosslinked polymethyl methacrylate, crosslinked polyethyl methacrylate, polyesters, polyamides, polycarbonates, polyphenylene ethers, polyoxymethylene, polyvinyl chloride, polystyrene, polyethylene, polypropylene, chloroprene rubber, nitrile rubber, ethylene-vinyl acetate copolymer, styrene-butadiene copolymer, acrylonitrile-styrene copolymer, and acrylonitrile-styrene-butadiene copolymer. These may be used alone, or two or more thereof may be used in combination. The organic filler is not limited to a particular shape, and may be appropriately selected from organic fillers of different particle diameters.

Examples of the materials of the inorganic fillers include quartz, silica, alumina, silica-titania, silica-titania-barium oxide, silica-zirconia, silica-alumina, lanthanum glass, borosilicate glass, soda glass, barium glass, strontium glass, glass-ceramic, aluminosilicate glass, barium boroaluminosilicate glass, strontium boroaluminosilicate glass, fluoroaluminosilicate glass, calcium fluoroaluminosilicate glass, strontium fluoroaluminosilicate glass, barium fluoroaluminosilicate glass, and strontium calcium fluoroaluminosilicate glass. These may be used alone, or two or more thereof may be used in combination. The inorganic filler is not limited to a particular shape, and may be appropriately selected from inorganic fillers of different shapes, such as irregularly shaped fillers, and spherical fillers.

A resin composition for optical shaping of the present invention may comprise a polymer to alter properties such as flexibility and flowability, provided that addition of a polymer is not against the intent and purpose of the present invention. Examples of polymers that may be added in the present invention include natural rubber, synthetic polyisoprene rubber, liquid polyisoprene rubber, hydrogenated products of these, polybutadiene rubber, liquid polybutadiene rubber, hydrogenated products of these, styrene-butadiene rubber, chloroprene rubber, ethylene-propylene rubber, acryl rubber, isoprene-isobutylene rubber, acrylonitrile-butadiene rubber, and styrene elastomers. Specific examples of other polymers that may be added in the present invention include a polystyrene-polyisoprene-polystyrene block copolymer, a polystyrene-polybutadiene-polystyrene block copolymer, a poly(a-methylstyrene)-polybutadiene-poly(a-methylstyrene) block copolymer, a poly(p-methylstyrene)-polybutadiene-poly(p-methylstyrene) block copolymer, and hydrogenated products of these.

A resin composition for optical shaping of the present invention may optionally comprise a softener. Examples of the softener include petroleum-base softeners such as paraffinic, naphthenic, and aromatic process oils, and vegetable oil-base softeners such as paraffin, peanut oil, and rosin. These softeners may be used alone, or two or more thereof may be used in combination. The softener content is not particularly limited, provided that it is not against the intent and purpose of the present invention. Typically, the softener content is at most 200 parts by mass, preferably at most 100 parts by mass relative to total 100 parts by mass of urethanized (meth)acrylic compound (A), (meth)acrylic acid ester compound (C), and (meth)acrylamide compound (D).

A resin composition for optical shaping of the present invention may contain a chemical polymerization initiator to improve curability, provided that it is not against the intent and purpose of the present invention. Preferred as chemical polymerization initiators are organic peroxides and azo compounds. The organic peroxides and azo compounds used as chemical polymerization initiators are not particularly limited, and may be known compounds. Typical examples of organic peroxides include ketone peroxide, hydroperoxides, diacyl peroxides, dialkyl peroxides, peroxyketals, peroxyesters, and peroxydicarbonates.

A resin composition for optical shaping of the present invention may comprise a known stabilizer, in order to inhibit deterioration, or to adjust photocurability. Examples of such stabilizers include polymerization inhibitors, ultraviolet absorbers, and antioxidants.

Examples of the polymerization inhibitors include hydroquinone, hydroquinone monomethyl ether, dibutylhydroquinone, dibutylhydroquinone monomethyl ether, 4-t-butyl catechol, 2-t-butyl-4,6-dimethylphenol, 2,6-di-t-butylphenol, and 3,5-di-t-butyl-4-hydroxytoluene. The content of polymerization inhibitor is preferably 0.001 to 1.0 parts by mass relative to total 100 parts by mass of urethanized (meth)acrylic compound (A), (meth)acrylic acid ester compound (C), and (meth)acrylamide compound (D).

A resin composition for optical shaping of the present invention may comprise a known additive, in order to adjust shades or paste properties. Examples of such additives include pigments, dyes, organic solvents, and thickeners.

A resin composition for optical shaping of the present invention has low viscosity, enabling easy stereolithographical fabrication of an object (particularly by bottom-up vat stereolithography), and can produce an object having desirable toughness and desirable water resistance. A resin composition for optical shaping of the present invention, and a cured product thereof can therefore be used in applications where such advantages can be exploited (for example, intraoral use), optimally for dental treatment using dental mouthpieces (oral appliances (OAs), night guards, dental splints), and denture base materials. Aside from such dental treatment applications using dental mouthpieces and denture base materials, a resin composition for optical shaping of the present invention is also suitable for mouthguards used for protection against external forces in sport activities. Preferably, a resin composition for optical shaping of the present invention is used as a resin composition for bottom-up vat stereolithography because its advantages, including toughness, water resistance, and fabricability can be more effectively exploited in such an application. A cured product using a resin composition for optical shaping of the present invention may have a shape that depends on intended use. In a resin composition for optical shaping of the present invention, the type and content of each component (urethanized (meth)acrylic compound (A), photopolymerization initiator (B), (meth)acrylic acid ester compound (C), (meth)acrylamide compound (D), and optional components such as a polymerization accelerator (E), a filler (F), a polymer, a softener, a stabilizer, and an additive) may be optionally adjusted according to use (for example, as a dental mouthpiece or a denture base material).

A resin composition for optical shaping of the present invention can be used in a wide variety of applications by taking advantage of its properties, specifically, the superior fabrication accuracy due to the low rate of volume shrinkage upon curing with light, and the ability to produce cured products of desirable properties, for example, three-dimensional objects having desirable toughness and water resistance. For example, a resin composition for optical shaping of the present invention can be used for the stereolithographical production of a three-dimensional object, the production of various solid objects, for example, a film-shaped object or a molding produced by a technique such as flow casting or casting, and a die for coating or vacuum molding.

A resin composition for optical shaping of the present invention is particularly suited for stereolithography. In stereolithography applications, a resin composition for optical shaping of the present invention enables smooth production of a three-dimensional object having desirable toughness and water resistance while ensuring superior fabrication accuracy with a maintained low rate of volume shrinkage at the time of curing with light.

Another embodiment of the present invention is a method for producing a three-dimensional object by stereolithography using any of the resin compositions for optical shaping described above.

In stereolithography (particularly, bottom-up vat stereolithography) using a resin composition for optical shaping of the present invention, any known bottom-up stereolithography method and device may be used (for example, a stereolithography device such as the DigitalWax® 020D manufactured by DWS). In the present invention, the light energy used to cure the resin is preferably an active energy beam. As used herein, "active energy beam" means an energy ray capable of curing a resin composition for optical shaping, and includes, for example, ultraviolet light, an electron beam, X-rays, radiant rays, and high-frequency waves. For example, the active energy beam may be ultraviolet light of 300 to 420 nm wavelengths. The light source of active energy beam may be, for example, a laser such as an Ar laser or a He—Cd laser; or a lighting such as a halogen lamp, a xenon lamp, a metal halide lamp, an LED, a mercury lamp, and a fluorescent lamp. Lasers are particularly preferred. When the light source is a laser, the fabrication time can be reduced by increasing the energy level, and a three-dimensional object of high shape precision can be obtained by taking advantage of the desirable convergence of a laser beam.

Stereolithography using a resin composition for optical shaping of the present invention may use any known method and any known stereolithography system, and the method and device are not particularly limited, as noted above. However, a typical example of a stereolithography method preferred for use in the present invention is a method that produces a three-dimensional object of the desired shape through a repeated procedure that includes a step of forming a cured layer by selectively applying an active energy beam to the resin composition for optical shaping to obtain a cured layer having a desired pattern, and a step of continuously forming another cured layer by similarly applying an active energy beam to a newly supplied, uncured liquid resin composition for optical shaping after lifting the previously cured layer. The resulting three-dimensional object may be used as it is, or may be used after improving mechanical characteristics, shape stability, or other properties by, for example, post-curing the product under applied light or heat.

A cured product of a resin composition for optical shaping of the present invention has a flexural modulus in a range of preferably 0.3 to 3.0 GPa, more preferably 0.5 to 2.5 GPa, even more preferably 0.8 to 2.0 GPa. With a flexural modulus of 2.0 GPa or less, a cured product can have softness, which makes the cured product, for example, a mouthpiece, more comfortable to wear by allowing it to more easily conform to the teeth. The cured product also becomes less likely to come off during sleep such as in sleep bruxism. A cured product of a resin composition for optical shaping of the present invention has a flexural strength of preferably 30 MPa or more, more preferably 40 MPa or more, even more preferably 50 MPa or more.

A three-dimensional object obtained by stereolithography is not limited to a particular structure, shape, or size, and these may be decided according to use. Typical examples of areas to which the stereolithography of the present invention is applicable include production of various models and molds, including, for example, models for assessing external designs in a designing process; models for checking functions of components and parts; resin molds for making molds; base models for making dies; and direct molds for prototype dies. More specifically, the stereolithography of the present invention is applicable to, for example, production of models or work models for precision components and parts, electrical and electronic components, furniture, architectural structures, automobile parts, various containers and vessels, castings, dies, and base molds.

EXAMPLES

The following describes the present invention in greater detail by way of Examples. It should be noted, however, that the present invention is in no way limited by the following Examples, and various changes may be made by a person with ordinary skill in the art within the technical idea of the present invention.

Synthesis Example 1

Production of Urethanized (Meth)Acrylic Compound (A-1)

(1) First, 250 g of isophorone diisocyanate and 0.15 g of di-n-butyltin dilaurate were added into a 5 L four-neck flask equipped with a stirrer, a thermostat, a thermometer, and a condenser, and the mixture was heated to 70° C. while being stirred.

(2) Separately, 1,000 g of a polycarbonate polyol (Kuraray Polyol® C-1090 manufactured by Kuraray Co., Ltd.; a polyol with a 1,6-hexanediol:3-methyl-1,5-pentanediol mass ratio of 9:1; a weight-average molecular weight Mw of 1,000) was added into a dropping funnel equipped with a side tube, and the solution in the dropping funnel was dropped into the flask of (1). Here, the solution was dropped at a constant rate over a time period of 4 hours with the temperature inside the flask held at 65 to 75° C. while stirring the solution in the flask of (1). After dropping, the mixture was stirred at the same temperature for 2 hours to allow for reaction.

(3) Thereafter, a homogenous solution prepared by adding 150 g of 2-hydroxyethyl acrylate and 0.4 g of hydroquinone monomethyl ether into a different dropping funnel was dropped at a constant rate over a time period of 2 hours with the temperature inside the flask held at 55 to 65° C., and a reaction was allowed for 4 hours at the maintained solution temperature of 70 to 80° C. in the flask to obtain a urethanized (meth)acrylic compound (A-1). By GPC analysis, the weight-average molecular weight Mw of urethanized (meth) acrylic compound (A-1) was found to be 1,700.

Synthesis Example 2

Production of Urethanized (Meth)Acrylic Compound (A-2)

(1) First, 250 g of isophorone diisocyanate and 0.15 g of di-n-butyltin dilaurate were added into a 5 L four-neck flask equipped with a stirrer, a thermostat, a thermometer, and a condenser, and the mixture was heated to 70° C. while being stirred.

(2) Separately, 2,500 g of a polyester polyol (Kuraray Polyol® P-2050 manufactured by Kuraray Co., Ltd.; a polyol of sebacic acid and 3-methyl-1,5-pentanediol; a weight-average molecular weight Mw of 2,000) was added into a dropping funnel equipped with a side tube, and the solution in the dropping funnel was dropped into the flask of (1). Here, the solution was dropped at a constant rate over a time period of 4 hours with the temperature inside the flask held at 65 to 75° C. while stirring the solution in the flask of (1). After dropping, the mixture was stirred at the same temperature for 2 hours to allow for reaction.

(3) Thereafter, a homogenous solution prepared by adding 150 g of 2-hydroxyethyl acrylate and 0.4 g of hydroquinone monomethyl ether into a different dropping funnel was dropped at a constant rate over a time period of 2 hours with the temperature inside the flask held at 55 to 65° C., and a reaction was allowed for 4 hours at the maintained solution temperature of 70 to 80° C. in the flask to obtain a urethanized (meth)acrylic compound (A-2). By GPC analysis, the weight-average molecular weight Mw of urethanized (meth) acrylic compound (A-2) was found to be 2,600.

Synthesis Example 3

Production of Urethanized (Meth)Acrylic Compound (A-3)

(1) First, 250 g of isophorone diisocyanate and 0.15 g of di-n-butyltin dilaurate were added into a 5 L four-neck flask equipped with a stirrer, a thermostat, a thermometer, and a condenser, and the mixture was heated to 70° C. while being stirred.

(2) Separately, 520 g of a polyester polyol (Kuraray Polyol® P-530 manufactured by Kuraray Co., Ltd.; a polyol of isophthalic acid and 3-methylpentanediol; a weight-average molecular weight Mw of 500) was added into a dropping funnel equipped with a side tube, and the solution in the dropping funnel was dropped into the flask of (1). Here, the solution was dropped at a constant rate over a time period of 4 hours with the temperature inside the flask held at 65 to 75° C. while stirring the solution in the flask of (1). After dropping, the mixture was stirred at the same temperature for 2 hours to allow for reaction.

(3) Thereafter, a homogenous solution prepared by adding 150 g of 2-hydroxyethyl acrylate and 0.4 g of hydroquinone monomethyl ether into a different dropping funnel was dropped at a constant rate over a time period of 2 hours with the temperature inside the flask held at 55 to 65° C., and a reaction was allowed for 4 hours at the maintained solution temperature of 70 to 80° C. in the flask to obtain a urethanized (meth)acrylic compound (A-3). By GPC analysis, the weight-average molecular weight Mw of urethanized (meth)acrylic compound (A-3) was found to be 1,100.

Synthesis Example 4

Production of Urethanized (Meth)Acrylic Compound (1)

(1) First, 250 g of isophorone diisocyanate and 0.15 g of di-n-butyltin dilaurate were added into a 5 L four-neck flask equipped with a stirrer, a thermostat, a thermometer, and a condenser, and the mixture was heated to 70° C. while being stirred.

(2) Separately, 1,000 g of a polycarbonate polyol (Nippollan 981 manufactured by Tosoh Corporation; a polyol of 1,6-hexanediol; a weight-average molecular weight Mw of 1,000) was added into a dropping funnel equipped with a side tube, and the solution in the dropping funnel was dropped into the flask of (1). Here, the solution was dropped at a constant rate over a time period of 4 hours with the temperature inside the flask held at 65 to 75° C. while stirring the solution in the flask of (1). After dropping, the mixture was stirred at the same temperature for 2 hours to allow for reaction.

(3) Thereafter, a homogenous solution prepared by adding 150 g of 2-hydroxyethyl acrylate and 0.4 g of hydroquinone monomethyl ether into a different dropping funnel was dropped at a constant rate over a time period of 2 hours with the temperature inside the flask held at 55 to 65° C., and a reaction was allowed for 4 hours at the maintained solution temperature of 70 to 80° C. in the flask to obtain a urethanized (meth)acrylic compound (1). By GPC analysis, the weight-average molecular weight Mw of urethanized (meth)acrylic compound (1) was found to be 1,700.

Synthesis Example 5

Production of Urethanized (Meth)Acrylic Compound (2)

(1) First, 250 g of isophorone diisocyanate and 0.15 g of di-n-butyltin dilaurate were added into a 5 L four-neck flask equipped with a stirrer, a thermostat, a thermometer, and a condenser, and the mixture was heated to 70° C. while being stirred.

(2) Separately, 2,500 g of a polyester polyol (HS2H-200S manufactured by Hokoku Co., Ltd.; a polyol of sebacic acid and 1,6-hexanediol; a weight-average molecular weight Mw of 2,000) was added into a dropping funnel equipped with a side tube, and the solution in the dropping funnel was dropped into the flask of (1). Here, the solution was dropped at a constant rate over a time period of 4 hours with the temperature inside the flask held at 65 to 75° C. while stirring the solution in the flask of (1). After dropping, the mixture was stirred at the same temperature for 2 hours to allow for reaction.

(3) Thereafter, a homogenous solution prepared by adding 150 g of 2-hydroxyethyl acrylate and 0.4 g of hydroquinone monomethyl ether into a different dropping funnel was dropped at a constant rate over a time period of 2 hours with the temperature inside the flask held at 55 to 65° C., and a reaction was allowed for 4 hours at the maintained solution temperature of 70 to 80° C. in the flask to obtain a urethanized (meth)acrylic compound (2). By GPC analysis, the weight-average molecular weight Mw of urethanized (meth)acrylic compound (2) was found to be 2,600.

The components used for the resin compositions of Examples and Comparative Examples are listed below with the abbreviations used.

Photopolymerization Initiator (B)

TPO: 2,4,6-Trimethylbenzoyldiphenylphosphine oxide

BAPO: Bis(2,4,6-trimethylbenzoyl)phenylphosphine oxide (Meth)Acrylic Acid Ester Compound (C) Having a Viscosity of 1,000 mPa·s or Less and a Boiling Point at Normal Pressure of 280° C. or More LMA: Lauryl methacrylate (manufactured by Kyoeisha Chemical Co., Ltd.; a viscosity of 4 mPa·s, an atmospheric equivalent boiling point of 305° C.)

CMA: Cetyl methacrylate (manufactured by NOF Corporation; a viscosity of 10 mPa·s, an atmospheric equivalent boiling point of 390° C.)

IBCHMA: 3-Isobornylcyclohexyl methacrylate (manufactured by Designer Molecules Inc.; a viscosity of 80 mPa·s, an atmospheric equivalent boiling point of 380° C.)

(Meth)Acrylamide Compound (D) Having a Viscosity of 1,000 mPa·s or Less and a Boiling Point at Normal Pressure of 200° C. or More ACMO: N-Acryloylmorpholine (manufactured by KJ Chemicals Corporation; a viscosity of 12 mPa·s, an atmospheric equivalent boiling point of 255° C.)

DEAA: N,N-Diethylacrylamide (manufactured by KJ Chemicals Corporation; a viscosity of 1.7 mPa·s, an atmospheric equivalent boiling point t of 220° C.)

Polymerization Inhibitor

BHT: 3,5-di-t-Butyl-4-hydroxytoluene

Examples 1 to 9 and Comparative Examples 1 to 3

The components were mixed under ordinary temperature (20° C.±15° C., JIS (Japanese Industrial Standards) Z 8703: 1983) in the amounts shown in Tables 1 and 2 to prepare pastes as resin compositions for optical shaping of Examples 1 to 9 and Comparative Examples 1 to 3.

Fabricability

The resin compositions for optical shaping of Examples and Comparative Examples were each fabricated into a specimen measuring 3.3 mm in thickness, 10.0 mm in width, and 64 mm in length (n=5), using a stereolithography device (DigitalWax® 020D, manufactured by DWS). The resin composition was determined as "Satisfactory" when it was fabricable into a sheet of the desired dimensions in all five specimens, and "Unsatisfactory" when the resin composition was not fabricable into the desired object in any of the five specimens. The specimens were used for the following evaluations.

Toughness (Flexural Modulus, Flexural Strength, Displacement of Fracture Point)

A cured product of the resin composition for optical shaping of each Example and Comparative Example was fabricated into a specimen (39.0 mm in length, 4.0 mm in width, 8.0 mm in thickness (height), a notch depth of 3.0 mm, 450 angle), following JIS T 6501:2012, Acrylic Resin for Denture Base. The specimens were evaluated in a flexural strength test conducted in accordance with JIS T 6501:2012 using a universal testing machine (Autograph AG-I, 100 kN, manufactured by Shimadzu Corporation) at a crosshead speed of 5 mm/min (n=5). The flexural strength and flexural modulus of the cured product were found by calculating means from values measured for each specimen. The preferred range of specimen's flexural modulus is 0.3 to 3.0 GPa, more preferably 0.5 to 2.5 GPa, even more preferably 0.8 to 2.0 GPa. The preferred range of flexural strength is 30 MPa or more, more preferably 40 MPa or more, even more preferably 50 MPa or more. As for the displacement of fracture point, the specimen was determined as being desirable when there was no fracture. Flexibility was determined as being desirable (Satisfactory) when the specimen did not have a fracture at the end of testing, or when a fracture occurred with a displacement of 20 mm or more, moderate (Acceptable) when a fracture occurred with a displacement of more than 10 mm and less than 20 mm, and poor (Unsatisfactory) when a fracture occurred with a displacement of 10 mm or less.

Water Resistance

A cured product of the resin composition of each Examples and Comparative Example was immersed in 37° C. water for 24 hours, and measured for flexural strength in the same manner as in the flexural strength test above (n=5). Water resistance is desirable when the rate of change (rate of decrease) of flexural strength after 24-hour immersion in 37° C. water is 10% or less relative to the initial flexural strength taken from the result of the flexural strength measurement conducted for evaluation of toughness.

Rate of change (rate of decrease) of flexural strength (%)=[{initial flexural strength (MPa)−flexural strength (MPa) after 24-hour immersion in 37° C. water}/initial flexural strength (MPa)]×100

Odor

The resin composition for optical shaping of each Example and Comparative Example was evaluated for odor by a group of 10 panelists (n=1). The resin composition was evaluated as "Satisfactory" when fewer than 2 panelists felt an unpleasant odor, "Acceptable" when at least 2 and fewer than 5 panelists felt an unpleasant odor, and "Unsatisfactory" when 5 or more panelists felt an unpleasant odor. The resin compositions are of satisfactory quality when there is no perceivable unpleasant odor.

TABLE 1

|  |  |  | Examples |  |  |  |  |  |  |  |  |
|---|---|---|---|---|---|---|---|---|---|---|---|
|  |  |  | 1 | 2 | 3 | 4 | 5 | 6 | 7 | 8 | 9 |
| Components (parts by mass) | (A) | Urethanized (meth)acrylic compound (A-1) | 70 | 55 | 80 |  |  | 60 | 60 | 70 |  |
|  |  | Urethanized (meth)acrylic compound (A-2) |  |  |  | 70 |  |  |  |  | 100 |
|  |  | Urethanized (meth)acrylic compound (A-3) |  |  |  |  | 70 |  |  |  |  |
|  | (B) | TPO | 3.0 | 4.0 | 2.0 | 3.0 | 3.0 | 3.0 | 3.0 | 3.0 | 3.0 |
|  |  | BAPO |  |  |  |  |  | 0.5 | 0.5 | 0.5 |  |
|  | (C) | LMA | 30 | 45 | 20 | 30 | 30 |  |  |  |  |
|  |  | CMA |  |  |  |  |  | 30 | 30 |  |  |
|  |  | IBCHMA |  |  |  |  |  |  |  | 30 |  |
|  | (D) | ACMO |  |  |  |  |  | 10 |  |  |  |
|  |  | DEAA |  |  |  |  |  |  | 10 |  |  |
|  |  | BHT | 0.05 | 0.05 | 0.05 | 0.05 | 0.05 | 0.05 | 0.05 | 0.05 | 0.05 |
| Fabricability |  |  | Satisfactory | Satisfactory | Satisfactory | Satisfactory | Satisfactory | Satisfactory | Satisfactory | Satisfactory | Satisfactory |
| Toughness |  | Flexural modulus (GPa) | 1.5 | 0.8 | 1.8 | 1.2 | 1.8 | 1.7 | 1.6 | 1.8 | 0.6 |
|  |  | Flexural strength (MPa) | 60 | 48 | 68 | 52 | 65 | 68 | 66 | 72 | 38 |
|  |  | Displacement of fracture point | Satisfactory | Satisfactory | Satisfactory | Satisfactory | Satisfactory | Satisfactory | Satisfactory | Satisfactory | Satisfactory |
| Water resistance |  | Flexural strength after immersion (MPa) | 60 | 46 | 67 | 50 | 65 | 64 | 62 | 70 | 38 |
|  |  | Rate of decrease (%) | 0 | 4.2 | 1.5 | 3.8 | 0 | 5.9 | 6.1 | 2.7 | 0 |
| Odor |  |  | Satisfactory | Satisfactory | Satisfactory | Satisfactory | Satisfactory | Satisfactory | Acceptable | Satisfactory | Satisfactory |

TABLE 2

|  |  | Comparative Examples |  |  |
|---|---|---|---|---|
|  |  | 1 | 2 | 3 |
| Components (parts by mass) | Urethanized (meth) acrylic compound (1) | 70 |  |  |
|  | Urethanized (meth) acrylic compound (2) |  | 70 | 55 |

TABLE 2-continued

| | | | Comparative Examples | | |
|---|---|---|---|---|---|
| | | | 1 | 2 | 3 |
| | (B) | TPO | 3.0 | 3.0 | 4.0 |
| | (C) | LMA | 30 | 30 | 45 |
| | | BHT | 0.05 | 0.05 | 0.05 |
| Fabricability | | | Satisfactory | Unsatisfactory | Satisfactory |
| Toughness | | Flexural modulus (GPa) | 2.4 | | 1.4 |
| | | Flexural strength (MPa) | 55 | | 38 |
| | | Displacement of fracture point | Unsatisfactory | | Acceptable |
| Water resistance | | Flexural strength after immersion (MPa) | 48 | | 28 |
| | | Rate of decrease (%) | 13 | | 26 |
| Odor | | | Satisfactory | Satisfactory | Satisfactory |

As shown in Tables 1 and 2, the resin compositions for optical shaping of Examples 1 to 9 had desirable fabricability, and the odor was weak. Toughness and water resistance were also desirable in the cured products of the resin compositions of Examples 1 to 9. Specifically, the cured products of the resin compositions for optical shaping according to Examples 1 to 9 had more desirable toughness and water resistance than the cured products of the resin compositions of Comparative Examples 1 and 3. The resin compositions for optical shaping according to Examples 1 to 9 had more desirable fabricability than the resin composition according to Comparative Example 2. The resin composition for optical shaping according to Comparative Example 2 was unable to form a specimen, and was unusable for the measurements of various properties.

INDUSTRIAL APPLICABILITY

A resin composition for optical shaping of the present invention has low viscosity, enabling easy stereolithographical fabrication of an object, and can produce an object having desirable toughness and desirable water resistance. A cured product of a resin composition for optical shaping of the present invention is particularly suited for dental mouthpieces and denture base materials.

The invention claimed is:

1. A resin composition, comprising:
    a urethanized (meth)acrylic compound (A); and
    a photopolymerization initiator (B),
    wherein the urethanized (meth)acrylic compound (A) is a (meth)acrylate comprising:
      a polyol moiety selected from the group consisting of a polyester, a polycarbonate, a polyurethane, and a polyether each having a structure derived from a C4 to C18 aliphatic chain diol unit (a) having a branched structure;
      a polyol moiety which is at least one selected from the group consisting of: a polyester having a structure derived from a C4 to C18 aliphatic chain dicarboxylic acid and/or aromatic dicarboxylic acid unit (b) having no branched structure and a polycarbonate having a structure derived from a C4 to C18 aliphatic chain diol unit (c) having no branched structure; and
      a urethane bond per molecule, and
    the urethanized (meth)acrylic compound (A) has a weight-average molecular weight of 800 to 20,000.

2. The resin composition according to claim 1, wherein the polyol moiety has a weight-average molecular weight of from 400 to 10,000.

3. The resin composition according to claim 1, further comprising:
    a (meth)acrylic acid ester compound (C) having a viscosity of 1,000 mPa·s or less and a boiling point at normal pressure of 280° C. or more, and/or
    a (meth)acrylamide compound (D) having a viscosity of 1,000 mPa·s or less and a boiling point at normal pressure of 200° C. or more.

4. The resin composition according to claim 3, wherein the (meth)acrylic acid ester compound (C) and/or the (meth)acrylamide compound (D) are monofunctional.

5. The resin composition according to claim 3, wherein the (meth)acrylic acid ester compound (C) is an aliphatic (meth)acrylic acid ester having a hydrocarbon group having 11 to 18 carbon atoms.

6. The resin composition according to claim 5, wherein the aliphatic (meth)acrylic acid ester is at least one selected from the group consisting of lauryl (meth)acrylate, tridecyl (meth)acrylate, tetradecyl (meth)acrylate, pentadecyl (meth)acrylate, cetyl (meth)acrylate, oleyl (meth)acrylate, and isobornylcyclohexyl (meth)acrylate.

7. A dental mouthpiece comprising a cured product of the resin composition of claim 1.

8. A denture base material comprising a cured product of the resin composition of claim 1.

9. A method, comprising
    stereolithographically producing a three-dimensional object with the resin composition of claim 1.

10. The resin composition according to claim 1, wherein the resin composition produces a cured resin having a flexural modulus of 0.3 to 2.0 GPa and a flexural strength of at least 40 MPa.

11. The resin composition according to claim 1, wherein the resin composition produces a cured resin having a rate of decrease of flexural strength after 24-hour immersion in 37° C. water of 10% or less relative to an initial flexural strength.

12. The resin composition according to claim 1, comprising
    60 to 99 mass % urethanized (meth)acrylic compound (A), based on a total mass of resin composition.

13. The resin composition according to claim 1, comprising
    70 to 99 mass % urethanized (meth)acrylic compound (A), based on a total mass of resin composition.

* * * * *